United States Patent
Sharpe et al.

(10) Patent No.: US 12,505,281 B2
(45) Date of Patent: Dec. 23, 2025

(54) SYSTEMS AND METHODS FOR UPDATING TEXTUAL ITEM DESCRIPTIONS USING AN EMBEDDING SPACE

(71) Applicant: Capital One Services, LLC, McLean, VA (US)

(72) Inventors: Samuel Sharpe, Cambridge, MA (US); Galen Rafferty, Mahomet, IL (US); Brian Barr, Schenectady, NY (US); Jeremy Goodsitt, Champaign, IL (US); Michael Davis, Arlington, VA (US); Taylor Turner, Richmond, VA (US); Owen Reinert, Queens, NY (US)

(73) Assignee: Capital One Services, LLC, McLean, VA (US)

( * ) Notice: Subject to any disclaimer, the term of this patent is extended or adjusted under 35 U.S.C. 154(b) by 170 days.

(21) Appl. No.: 18/409,494

(22) Filed: Jan. 10, 2024

(65) Prior Publication Data

US 2025/0225314 A1    Jul. 10, 2025

(51) Int. Cl.
*G06F 40/30* (2020.01)
*G06F 40/166* (2020.01)
*G06F 40/284* (2020.01)
*G06N 3/0475* (2023.01)
*G06F 16/334* (2025.01)
*G06F 40/295* (2020.01)

(52) U.S. Cl.
CPC ......... *G06F 40/166* (2020.01); *G06F 40/284* (2020.01); *G06F 40/30* (2020.01); *G06N 3/0475* (2023.01); *G06F 16/3347* (2019.01); *G06F 40/295* (2020.01)

(58) Field of Classification Search
CPC ...... G06F 40/284; G06F 40/30; G06F 40/295; G06F 40/56; G06F 40/40; G06F 40/205; G06F 40/211; G06F 40/247; G06F 40/35; G06N 3/0475; G06N 20/00; G06N 3/08
USPC ............................................................. 704/9
See application file for complete search history.

(56) References Cited

U.S. PATENT DOCUMENTS

| | | | |
|---|---|---|---|
| 11,461,668 B1* | 10/2022 | Mohandas | G06F 40/30 |
| 11,727,210 B2* | 8/2023 | Wang | G06F 40/205 |
| | | | 704/9 |
| 2020/0184012 A1* | 6/2020 | Stoyanovsky | G06F 40/56 |
| 2022/0156298 A1* | 5/2022 | Mahmoud | G06F 16/9535 |
| 2022/0277142 A1* | 9/2022 | Mohan | G06F 40/295 |
| 2022/0277143 A1* | 9/2022 | Jayarao | G06F 40/295 |
| 2023/0205996 A1* | 6/2023 | Atallah | G06F 40/295 |
| | | | 704/9 |

(Continued)

*Primary Examiner* — Vijay B Chawan
(74) *Attorney, Agent, or Firm* — Foley & Lardner LLP

(57) ABSTRACT

Systems and methods are disclosed herein for generating updated descriptions of items based on analyzing candidate embeddings of semantic representations of item descriptions. The system may obtain a text file describing an item. The system may provide the text file to a generative language model to generate semantic representations of the text file. The system may generate, based on the text file, candidate embeddings in an embedding space. The system may obtain embeddings associated with existing items. The system may determine subsets of the embeddings within a threshold distance. The system may compare the subsets. The system may determine attributes associated with a candidate embedding based on the comparison. The system may generate an updated text file based on the attributes.

20 Claims, 7 Drawing Sheets

(56) References Cited

U.S. PATENT DOCUMENTS

| | | | |
|---|---|---|---|
| 2024/0362093 A1* | 10/2024 | Zhou | G06F 16/243 |
| 2025/0103826 A1* | 3/2025 | Dicklin | G06F 16/9032 |
| 2025/0225314 A1* | 7/2025 | Sharpe | G06F 40/56 |
| 2025/0259013 A1* | 8/2025 | Reinert | G06F 40/284 |

* cited by examiner

200

Textual Description
202

| Document Type 204 | Simple Description |
|---|---|
| This item is a chair with three round legs, an ergonomic seat, and an armrest. The item is green and yellow with pink polka dots. The item is of medium height and width for chairs. The chair is very solid and made of metal and wood, perfect for a rustic look. | |

Semantic Representation
212

| Document Type 214 | Technical Description |
|---|---|
| The item is a structure on which users may sit. The structure comprises three cylindrical legs and a backrest with lumbar support. The structure is adorned with colorful accents. The dimensions of the item are 50 cm by 50 cm by 254 cm. The chair is made of balsa wood with a 4324 silicon steel frame. | |

FIG. 2

SYSTEMS AND METHODS FOR UPDATING TEXTUAL ITEM DESCRIPTIONS USING AN EMBEDDING SPACE

BACKGROUND

Though the amount of information that is generated, stored, and shared has been increasing in recent years, the quality of this data has not necessarily improved. Large language models have begun to shape the way in which verbal information is created, promising to improve the efficiency of writing a variety of texts, speeches, or other forms of expression. However, written information generated through large language models may include hallucinations, errors in register or style, or other issues that make their outputs less effective at conveying the desired information. For example, large language models, or other natural language generation (NLG) or processing (NLP) methods may have issues with malicious content, prompt injection, data privacy, misinformation, and bias. As such, large language models may be less than ideal or even harmful where the generated verbal content is unsatisfactory, inaccurate, or imprecise.

SUMMARY

Pre-existing natural language generation systems enable generation of content, such as written text, based on prompts, descriptions, or ideas. However, this content is limited by training data available to the model used for generation, such as a large language model (LLM). Because the training data is unlikely to include all categories, subject areas, or time periods of data, content generated from LLMs may be agnostic to relevant or recent data associated with the prompt and corresponding generated content. Furthermore, an LLM does not provide specific information concerning the training data on which the training is carried out. To illustrate, a user may submit an informal prompt describing a computer algorithm to an LLM to cause the LLM to generate a technical whitepaper describing the algorithm. Recently published information on a computer algorithm that is similar to that described in the prompt may exist, but the LLM will likely not incorporate such information into the generated results, as training of the LLM may not be carried out often (or recently) enough. As such, the LLM does not provide information relating to whether such a similar algorithm already exists, or whether the generated algorithm is unique and distinct from other pre-existing algorithms. Thus, pre-existing LLMs lack functionality to provide meaningful suggestions and updates on the basis of existing relevant data.

To solve these issues with pre-existing LLMs, methods and systems are described herein for updating written descriptions based on analyzing an encoding space around related texts generated through an LLM. For example, the system may utilize the LLM to generate a variety of whitepapers that represent a description of a computer algorithm. The system may embed these generated whitepapers in an embedding space to represent the semantic significance of each generated text. Thus, the system may compare the generated whitepapers with other texts from a database of known texts, where these other texts are represented in the embedding space as well. As such, the system may analyze other previously encountered texts for similarity with these generated whitepapers to determine how to update the original description of the computer algorithm. The system may change the description of a computer algorithm to include semantic elements of other similarly described algorithms found in the encoding space. As a result, the system may update the written description of the computer algorithm to include features that are relevant or useful. By doing so, the system may use the large language model to generate updated whitepapers based on this updated written description to improve the applicability of the computer algorithm to relevant computational problems, thereby adapting content on the basis of existing data to benefit the user's technical objectives.

In some aspects, the system may obtain a text file describing an item. As an illustrative example, the system may obtain a text file describing a computer algorithm in informal terms, such as a non-technical description of the underlying process for the computer algorithm. By receiving this text file, the system enables a user (e.g., a software engineer) to transform ideas from one form to another. For example, the user may submit the text file with the computer algorithm description with the intention of generating a more detailed, technical description of the algorithm, or code in a chosen programming language.

In some aspects, the system may provide the text file to a generative language model to generate the semantic representations. For example, the system may provide the text file to a generative language model to cause the generative language model to generate a first semantic representation of the textual description and a second semantic representation of the textual description different from the first semantic representation. In some embodiments, the generative language model may be trained to generate semantic representations based on text files. As an illustrative example, the generative language model (e.g., an LLM) may convert a textual, informal description of a computer algorithm into more than one technical, fleshed-out version that includes sample code, based on previously trained model weights. Because the LLM may generate multiple representations of the initial description of the computer algorithm, the system improves the possibilities for a satisfactory output whitepaper. For example, the system may carry out analytics on each of these generated semantic representations of the originally submitted algorithm to determine an updated description that better suits the user's technical objectives. As such, the system enables robust and flexible generation of output language data on the basis of input language.

In some aspects, the system may generate candidate embeddings of these semantic representations in an embedding space. For example, the system may generate, in an embedding space, a first candidate embedding of the first semantic representation and a second candidate embedding of the second semantic representation. As an illustrative example, the system may generate language tokens from the technical whitepapers that were generated from the informal description of the computer algorithm. Based on vectorizing these language tokens, the system may represent these technical whitepapers in an embedding space, where distance between whitepapers indicates a similarity between the two in lexicon, semantics, or significance. By doing so, the system enables analysis and comparisons between generated whitepapers and other previously encountered data, as all such data may be represented and compared in the same embedding space.

In some aspects, the system may obtain a plurality of embeddings associated with existing items. For example, the system may obtain a plurality of embeddings of semantic representations of text associated with a set of existing items. In some embodiments, each embedding of the plurality of embeddings is represented in the embedding space.

As an illustrative example, the system may process previously published whitepapers or other technical content to generate corresponding embeddings within the same embedding space. These whitepapers may be recently written and published, such as by other users, scientists, or software engineers. As such, the system enables analysis of the body of existing information for further tuning of the informal written description provided by the user, as well as the corresponding generated whitepapers. For example, the user may determine to design a computer algorithm based on how similar these generated whitepapers are to previous algorithms that have already been implemented, to improve the chances of the algorithm functioning or support for the algorithm.

In some aspects, the system may determine subsets of the embeddings that are within a threshold distance. For example, the system may determine a first subset of the plurality of embeddings that are within a threshold distance from the first candidate embedding within the embedding space and a second subset of the plurality of embeddings that are within the threshold distance from the second candidate embedding within the embedding space. As an illustrative example, the system may utilize the embeddings of previously encountered texts to determine a number of these that are similar enough to each of the generated whitepapers (e.g., to within a threshold distance in the embedding space). By doing so, the system enables analysis of previous data and ideas that may be similar to the currently generated whitepapers. By generating more than one whitepaper associated with the input description, the system enables further tuning of the description (e.g., the algorithm) based on attributes of other similar ideas represented in the embedding space that may be desirable or undesirable. Thus, the system disclosed herein enables tuning of written descriptions of items and ideas on the basis of a corpus of known information.

In some aspects, the system may compare the subsets. For example, the system may compare the first subset with the second subset, and, based on this comparison, the system may determine attributes associated with a candidate embedding. Based on comparing the first subset with the second subset, the system may determine one or more attributes associated with the first candidate embedding. As an illustrative example, the system may determine that, for the first candidate embedding, a greater number of analogs (e.g., previously known whitepapers) have been determined to be within the threshold distance within the embedding space than for the second candidate embedding. The system may determine that this first candidate embedding possesses attributes that are similar to these other previously known whitepapers as compared to the second candidate embedding. For example, the first candidate embedding may include a Fourier transform step that the second candidate embedding does not include and, as such, the first candidate embedding is similar to many other similar previously published algorithms that are represented in the embedding space. By identifying these attributes, the system may determine how to modify the initial description of the computer algorithm to emphasize these attributes, such as in situations where a user desires to generate an algorithm with greater applicability or potential popularity.

In some aspects, the system may generate an updated text file. For example, the system may generate, based on the text file and the one or more attributes, an updated text file. As an illustrative example, the system may determine that there are many previously constructed computer algorithms that include a particular attribute (e.g., a Fourier transform step).

The system may generate a prompt to the large language model to include this attribute (e.g., the Fourier transform step) in the written description. By doing so, the system enables further generation of useful content, such as detailed whitepapers, by incorporating attributes deemed desirable based on an analysis of similar, previously known data sources.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 shows an illustrative schematic of a textual description and a semantic representation of the textual description, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
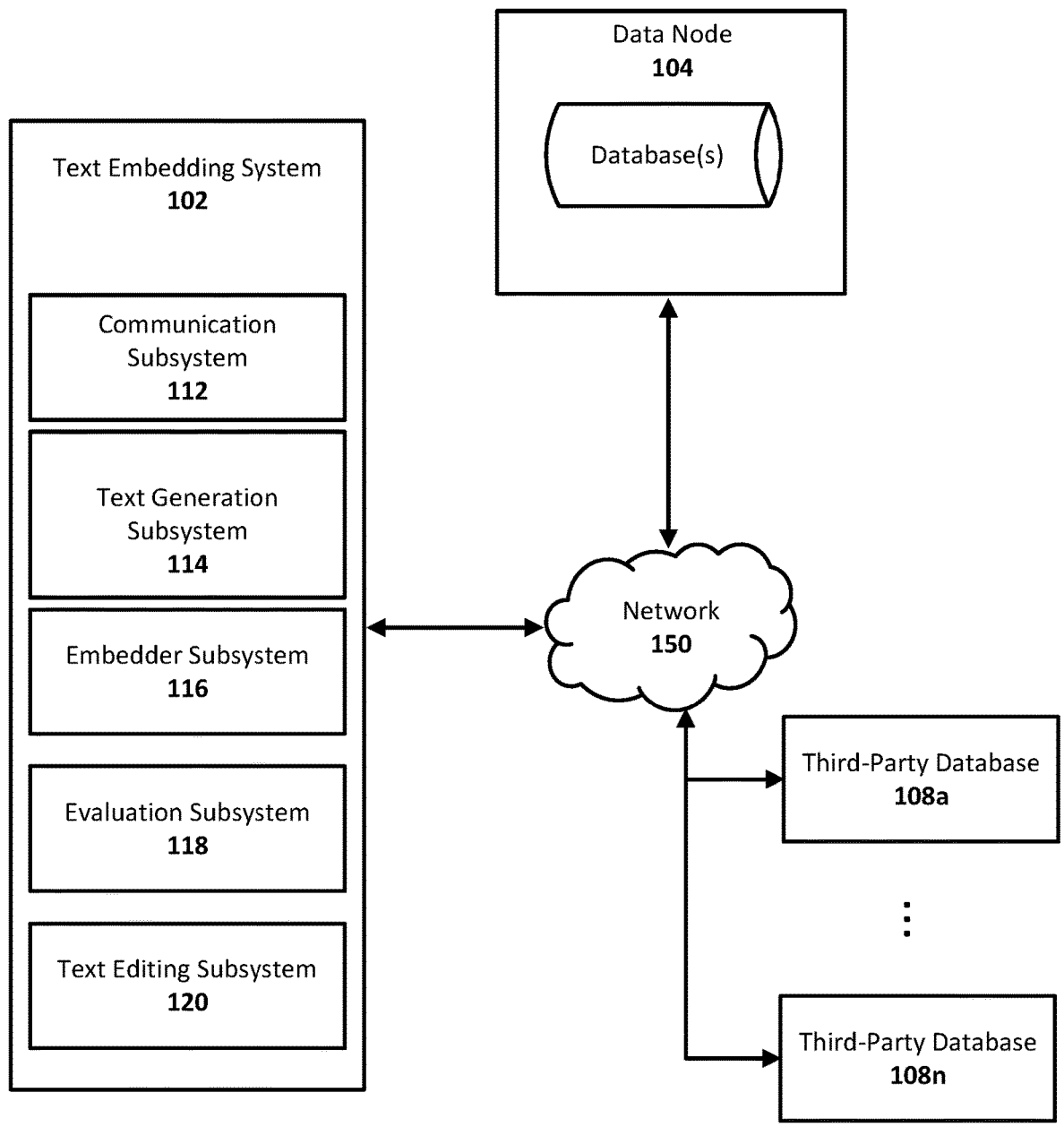
FIG. 1 shows an illustrative environment for updating textual descriptions of items based on generated semantic embeddings, in accordance with one or more embodiments of this disclosure.

FIG. 1 shows an illustrative environment for updating textual descriptions of items based on generated semantic embeddings, in accordance with one or more embodiments of this disclosure. Environment 100 may include text embedding system 102, data node 104, and one or more third-party databases 108*a-n*, any of which may be configured to communicate through network 150. Text embedding system 102 may include software, hardware, or a combination of both and may reside on a physical server or a virtual server running on a physical computer system. In some embodiments, text embedding system 102 may be configured on a user device (e.g., a laptop computer, smartphone, desktop computer, electronic tablet, or another suitable user device). Furthermore, text embedding system 102 may reside on a server or node or may interface with third-party databases either directly or indirectly.

Data node 104 may store various data, including one or more machine learning models (e.g., model weights associated with an LLM, a generative language model, an embedder, etc.), semantic data (e.g., text files, semantic representations, or embeddings), training data (e.g., training text files, training semantic representations, or training embeddings), attention weights, or other suitable data. Data node 104 may include software, hardware, or a combination of the two. In some embodiments, text embedding system 102 and data node 104 may reside on the same hardware or the same virtual server or computing device. Network 150 may be a local area network, a wide area network (e.g., the internet), or a combination of the two. Third-party databases 108a-n may reside on client devices (e.g., desktop computers, laptops, electronic tablets, smartphones, servers, or other computing devices that interact with network 150, cloud devices, or servers).

Text embedding system 102 may receive text files, semantic tokens, semantic embeddings (e.g., candidate embeddings or embeddings associated with existing items), attention weights, or other suitable information from one or more devices. Text embedding system 102 may receive such data using communication subsystem 112, which may include software components, hardware components, or a combination of both. For example, communication subsystem 112 may include a network card (e.g., a wireless network card or a wired network card) that is associated with software to drive the card and enables communication with network 150. In some embodiments, communication subsystem 112 may also receive data from or communicate with data node 104 or another computing device. Communication subsystem 112 may receive data, such as text files, updated text files, candidate embeddings, embeddings associated with existing items, attention weights, threshold distances, or other suitable data. Communication subsystem 112 may communicate with text generation subsystem 114, embedder subsystem 116, evaluation subsystem 118, text editing subsystem 120, data node 104, or any devices communicably connected to network 150.

In some embodiments, text embedding system 102 may include text generation subsystem 114. Text generation subsystem 114 may perform tasks that generate text, such as semantic representations based on prompts, such as text files or audio files. For example, text generation subsystem 114 may generate text of a different format, register, or style based on an input description of a given item, such as through use of an LLM for natural language generation (e.g., a generative language model). Text generation subsystem 114 may include software components, hardware components, or a combination of both. For example, text generation subsystem 114 may include software components, or may include one or more hardware components (e.g., processors) that are able to execute operations for generating vector encodings from communication data, such as textual communications. Text generation subsystem 114 may access data, such as text files, training semantic representations, or prompts (e.g., audio- or text-based). Text generation subsystem 114 may directly access data, systems, or nodes associated with third party databases 108a-n and may transmit data to such systems. In some embodiments, text generation subsystem 114 may receive data from or send data to text generation subsystem 114, embedder subsystem 116, evaluation subsystem 118, text editing subsystem 120, data node 104, or any devices communicably connected to network 150.

Embedder subsystem 116 may execute tasks relating to generation of embeddings of semantic representations representing words, phrases, documents, or other collections of semantic tokens (e.g., based on text generated by text generation subsystem 114). Embedder subsystem 116 may include software components, hardware components, or a combination of both. For example, in some embodiments, embedder subsystem 116 may receive a semantic representation of a textual description of an item, as generated at text generation subsystem 114. Embedder subsystem 116 may provide the semantic representation to an embedder model (e.g., a vectorization model, such as word2vec, or doc2vec), for generation of embeddings within an embedding space (e.g., a vector space), where the position of the embeddings within the embedding space encodes semantic information associated with the embedding. Embedder subsystem 116 may access data, such as semantic representations of verbal content (e.g., text files, or corresponding natural language tokens), as well as embeddings (e.g., for training of the embedder). Embedder subsystem 116 may directly access data, systems, or nodes associated with third-party databases 108a-n and may be able to transmit data to such nodes (e.g., to obtain embeddings associated with existing items). Embedder subsystem 116 may receive data from or transmit data to other systems or subsystems within environment 100, such as communication subsystem 112, text generation subsystem 114, evaluation subsystem 118, text editing subsystem 120, data node 104, or any devices communicably connected to network 150.

Evaluation subsystem 118 may execute tasks relating to the evaluation or analysis of candidate embeddings within the embedding space. For example, evaluation subsystem 118 may compare subsets of embeddings within a threshold distance from a candidate embedding in the embedding space to determine attributes associated with the candidate embedding. As such, evaluation subsystem 118 may include software components, such as application programming interface (API) calls, hardware components, or a combination of both. Evaluation subsystem 118 may receive (e.g., from embedder subsystem 116) candidate embeddings or embeddings of existing items for analysis of which candidate embeddings are closer to other previously generated embeddings corresponding to descriptions of other items. For example, evaluation subsystem 118 may transmit attributes associated with embeddings to text editing subsystem 120 for modification of a text file. In some embodiments, evaluation subsystem 118 may receive data from network 150, data node 104, or third-party databases 108a-n. For example, evaluation subsystem 118 may communicate with other components of environment 100, such as communication subsystem 112, text generation subsystem 114, embedder subsystem 116, or text editing subsystem 120.

Text editing subsystem 120 may execute tasks relating to the generation or updating of text, such as text files. For example, text editing subsystem 120 may update a text file based on attributes identified by evaluation subsystem 118. As such, text editing subsystem 120 may include software components, hardware components, or a combination of both. For example, text editing subsystem 120 may access or utilize a generative language model associated with text generation subsystem 114 for generating a modified text file that emphasizes or de-emphasizes attributes identified by evaluation subsystem 118. Text editing subsystem 120 may communicate with other components of environment 100, such as communication subsystem 112, text generation subsystem 114, embedder subsystem 116, evaluation subsystem 118, data node 104, or any devices communicably connected to network 150.

FIG. 2 shows illustrative schematic 200 of textual description 202 and semantic representation 212 of the textual description, in accordance with one or more embodiments. For example, text generation subsystem 114 may obtain textual description 202 of a first document type (e.g., document type 204) and provide the associated text file to a generative language model for generation of a semantic representation (e.g., semantic representation 212) of the textual description of a different document type (e.g., document type 214). By doing so, text embedding system 102 may generate different versions, formats, or styles for representing the same idea or concept, thereby providing options for further tuning or updating the textual description for an associated item.

In some embodiments, text embedding system 102 (e.g., through communication subsystem 112) may obtain a text file including a textual description of an item. For example, text embedding system 102 may receive a text file using a network device or component of text embedding system 102, where the text file includes a verbal or textual description (e.g., including semantic tokens) of a given item, idea, or concept. As an illustrative example, text embedding system 102 may receive textual description 202, which includes a simple, informal description of a chair (e.g., a product for sale). Additionally, or alternatively, text embedding system 102 may receive a description that includes a non-technical description of a computer algorithm or code. In some embodiments, textual description 202 may include semantic tokens (e.g., text strings that include words, phrases, sentences, or other units that encode semantic information), such as in a vectorized form. By receiving information relating to a given item or concept, text embedding system 102 may generate text or other verbal content of different styles or formats on the basis of these obtained descriptions, thereby enabling analysis and subsequent modification of the described idea to achieve any objectives or goals, as described further below.

For example, a textual description may include a verbal description of an item, concept, or idea. For example, a textual description may include a description of a product, such as a physical description of a chair (e.g., as shown as textual description 202 in FIG. 2). Alternatively, or additionally, a textual description may include an invention disclosure (e.g., for an invention), or any other concept or idea. For example, a textual description includes a description of a method of operation of a computer algorithm. Text embedding system 102, communication subsystem 112, text generation subsystem 114 or any other component of environment 100 may receive and process non-textual descriptions additionally or alternatively, such as audio files, video files, or image files. By receiving a description of an idea, text embedding system 102 enables further processing, modification, or conversion of the description to other formats (e.g., other document types, such as document type 214), and further analysis through comparison with other texts describing other items.

A text file may include a data structure that includes textual data (e.g., verbal or alphanumeric data in any language or writing system). For example, a text file may include a document that includes semantic tokens, such as words, phrases, sentences, or other tokens that exhibit semantic, lexical, or syntactic value. Text data, such as data within a text file, may be represented through semantic token vectors, which may include data arrays or vectors, each element of which includes one or more semantic tokens. As an illustrative example, a text file may include an indication of a text string that includes sentences that describe a product, algorithm, or invention, such as textual description 202 in relation to a chair. For example, text files relating to items may be stored in a text file database (e.g., at least one of third-party databases 108a-n). For example, text embedding system 102 may generate a query, through communication subsystem 112, to one of third-party databases 108a-n for text files relating to other existing items (e.g., existing descriptions of items, such as existing patents, technical whitepapers, or other information). By doing so, text embedding system 102 enables analysis of a variety of text files and descriptions of items, in order to suggest modifications or improvements to the text file according to a user's objectives. For example, as discussed further below, text editing subsystem 120, through text generation subsystem 114, may generate updated text files based on attributes identified during an analysis of the text file and associated generated semantic representations. In some embodiments, communication subsystem 112 may receive or generate training text files (e.g., for a generative language model associated with text generation subsystem 114) and provide this training data to the generative language model to improve generation of semantic representations of textual descriptions of items.

An item may include a concept, idea, product, algorithm, method, or any entity. As an illustrative example, an item may include an invention associated with an invention disclosure, such as a chair, as described through textual description 202 in FIG. 2. Additionally, or alternatively, an item may include a product for use by consumers (e.g., physical or non-physical, such as a chair for sale, computer software or banking software). By receiving descriptions of items, text embedding system 102 may analyze features, attributes, or other elements associated with both the item itself, as well as other existing items for which textual descriptions exist. As such, text embedding system 102 enables monitoring and evaluation of an item (or its associated description) on the basis of a corpus of texts that may be relevant or similar to the item (e.g., existing items that have already been documented, published, or otherwise disclosed).

Figure 3:
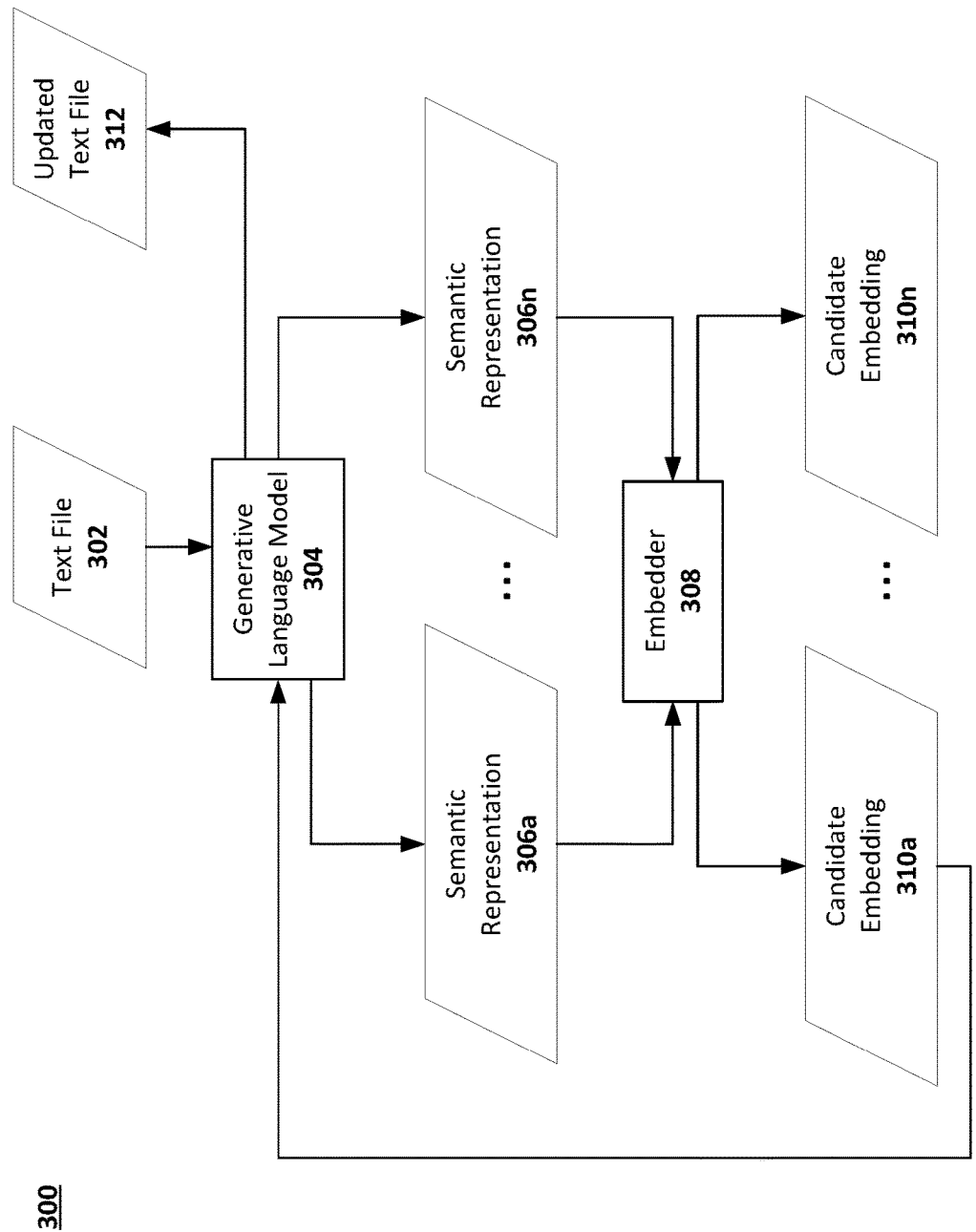
FIG. 3 shows an illustrative flow for updating textual descriptions of items using a generative language model and an embedder, in accordance with one or more embodiments.

FIG. 3 shows illustrative flow 300 for updating textual descriptions of items using a generative language model and an embedder, in accordance with one or more embodiments. For example, flow 300 may accept text file 302 at generative language model 304 for generation of corresponding semantic representations 306a-n. Embedder subsystem 116 may embed these semantic representations 306a-n using embedder 308 to generate candidate embeddings 310a-n. Evaluation subsystem 118 may evaluate the candidate embeddings and determine one or more candidate embeddings with which to generate updated text file 312, such as by providing attributes associated with candidate embedding 310a to generative language model 304. As such, the systems and methods disclosed herein enable updates or modifications to textual descriptions of items through analysis of various semantic representations generated from a given input textual description.

In some embodiments, text embedding system 102 may provide a text file (e.g., text file 302) to a generative language model (e.g., generative language model 304) to generate semantic representations (e.g., semantic representations 306a-n) of the textual description associated with the text file. For example, text generation subsystem 114 may provide the text file to a generative language model to cause the generative language model to generate a first semantic representation of the textual description and a second semantic representation of the textual description different from the first semantic representation. In some embodiments, the generative language model is trained to generate semantic representations based on text files. As an illustrative example, text generation subsystem 114 may provide the textual description (e.g., textual description 202 of a chair) to an LLM, along with a prompt (e.g., a prompt that requests generation of a technical whitepaper on the basis of the provided textual description). Based on the prompt and the provided textual description, text generation subsystem 114 may generate, through the LLM, a set of technical whitepapers (e.g., semantic representations 306a-306n) that describe the contents of the text file in different ways (e.g., different styles, or emphasizing different features of the chair). As such, text embedding system 102 enables generation of a variety of semantic representations of a given item, such as a chair, in a manner that provides a user a multitude of options of styles or features of the item on which to focus.

For example, generative language model 304 may include a model, process, or algorithm capable of generating language (e.g., natural language, computer code, or other data). Generative language model 304 may include a large language model that is capable of receiving an input text and repeatedly predicting additionally words or tokens (e.g., contextually). As an illustrative example, generative language model 304 may accept text file 302 and generate output texts or, for example, other semantic representations that are associated with the contents of text file 302, represented in a different style, document format, or register. In some embodiments, generative language model 304 may include artificial intelligence accelerators, which may be able to process large amounts of text data from the internet. For example, generative language model 304 may include artificial neural networks (ANNs) with weights. Generative language model 304 may be trained using self-supervised learning, semi-supervised learning, or unsupervised learning. In some embodiments, generative language model 304 may preprocess input data or training data (e.g., through dataset purification of training data, or probabilistic tokenization of input data). For example, text generation subsystem 114 may split input text files or training text files provided to generative language model 304 into the most frequent n-grams (e.g., a series of n tokens adjacent to a given token), with each token assigned an integer (e.g., tokenization). Such tokens that characterize the text may be stored in the form of a vector or as an embedding in an embedding space, as described below in relation to FIG. 4. Additionally, or alternatively, generative language model 304 may provide the outputs (e.g., semantic representations of the input text) in a tokenized or vectorized format. By transforming text or meaning associated with an input text file (e.g., text file 302) to data of other formats or types (e.g., semantic representations 306a-306b), text embedding system 102 enables processing, analysis, and transformation of verbal data in a manner that enables comparison with other pre-existing, similar texts or data.

For example, a semantic representation (e.g., one of semantic representations 306a-306n) generated at generative language model 304 may include a representation or version of an item (or a corresponding textual description of the item) that includes semantic meaning, such as natural language tokens (e.g., words, phrases, sentences, paragraphs, or documents). For example, semantic representation 212, as shown in FIG. 2, may include a text file or another document structure that includes a technical description (e.g., of document type 214, such as a technical whitepaper). As an illustrative example, in situations where text file 302 includes an informal, general description of an inventor's new invention, semantic representation 306a generated by generative language model 304 may include an example of a full patent application with relevant technical details of the inventor's new invention. Alternatively, or additionally, in situations where text file 302 includes a description of a product (e.g., as in a marketing campaign for that product), semantic representation 306b may include a simulated product review or recommendation by a user of the product. In some embodiments, a user of text embedding system 102 may determine a number of semantic representations 306a-306n to generate on the basis of an input text file (e.g., text file 302). In some embodiments, a user may determine or control document types (e.g., document type 204 or document type 214) associated with each generated semantic representation, such as by providing a prompt with this information to the associated generative language model. In some embodiments, text embedding system 102 may generate multiple semantic representations corresponding to the same segment of text (e.g., within a text file or otherwise), where each semantic representation may include a different semantic representation of the same input text. In some embodiments, text embedding system 102 may generate multiple semantic representations based on different portions or aspects of the textual description (e.g., as associated with different portions of the text file). Based on these semantic representations 306a-n of text file 302, text embedding system 102 may generate corresponding candidate embeddings in a candidate space, as described in relation to FIG. 4 below.

In some embodiments, text embedding system 102 may train generative language model 304 using a training dataset that includes text files and corresponding training semantic representations of these training text files. For example, text embedding system 102 may obtain (e.g., through communication subsystem 112) a plurality of training text files and a plurality of training semantic representations. In some embodiments, each training semantic representation of the plurality of training semantic representations is associated with a corresponding training text file of the plurality of training text files. Text embedding system 102 may generate a plurality of training semantic token vectors. In some embodiments, each training semantic token vector of the plurality of training semantic token vectors represents the corresponding training text file of the plurality of training text files using semantic tokens. Text embedding system 102 may provide a training dataset to the generative language model to train the generative language model to generate semantic representations. The training dataset may include the plurality of training semantic token vectors and the plurality of training semantic representations. As an illustrative example, text embedding system 102 may obtain text files corresponding to multiple textual descriptions of multiple objects, such as a product description of a chair, computer algorithm, or software in a catalog of such products. Furthermore, text embedding system 102 may obtain corresponding representations of these multiple objects in different prose styles or document formats. For example, text embedding system 102 may obtain actual (e.g., ground-truth) data, such as customer reviews of such products, including descriptions of their use and impressions of these products. Based on providing both of these datasets to the generative language model (e.g., generative language model 304), text embedding system 102 may train model weights associated with data node 104 according to such information to provide improved recommendations with respect to these products. In some embodiments, such training data may be targeted to relevant document types, such as patent publications or product reviews, according to a stated objective for the user.

Figure 4:
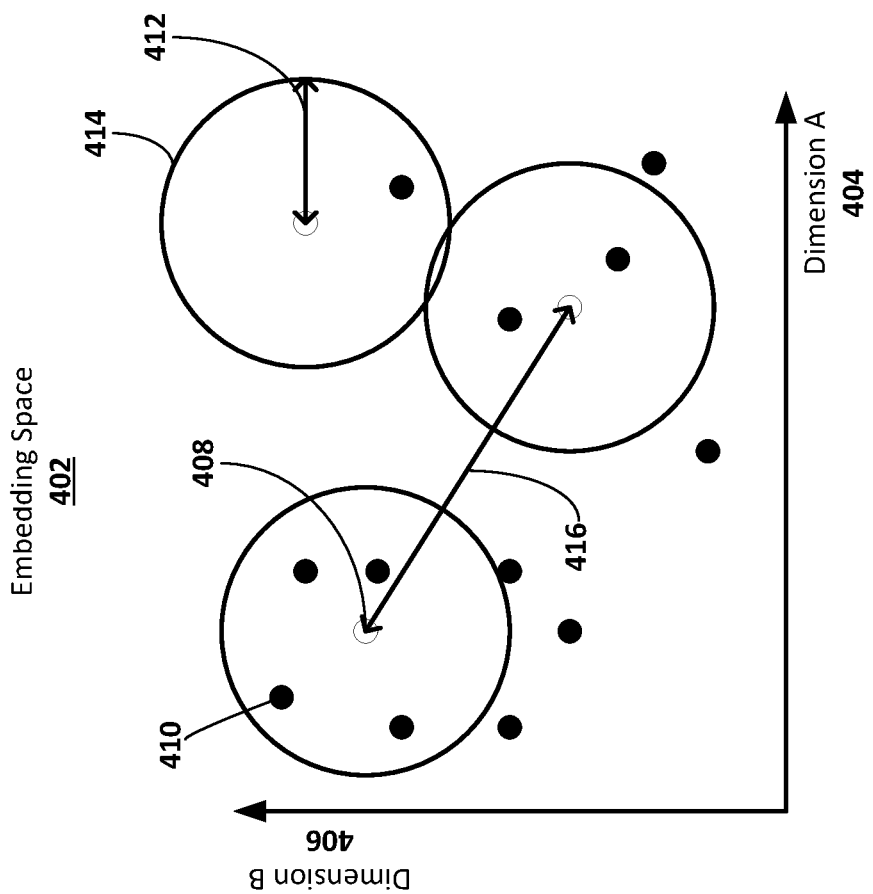
FIG. 4 shows an illustrative plot of an embedding space with candidate embeddings and other embeddings shown, in accordance with one or more embodiments.

FIG. 4 shows illustrative plot 400 of an embedding space 402 with candidate embeddings and other embeddings shown, in accordance with one or more embodiments. For example, plot 400 describes position 408 of a candidate embedding within embedding space 402, In some embodiments, position 408 represents semantic or lexical meaning associated with the corresponding candidate embedding. Additionally, or alternatively, FIG. 4 may represent other embeddings corresponding to pre-existing items (e.g., other patents associated with similar products, or customer reviews associated with similar pre-existing products) within embedding space 402, such as position 410 on plot 400. In some embodiments, embedding space 402 may include indications of spherical volumes, (e.g., as represented by circular projection 414 on FIG. 4), with corresponding radii (e.g., radius 412). By representing these elements within the embedding space, text embedding system 102 enables direct comparison of generated semantic representations of input descriptions with a corpus of similar texts or data.

In some embodiments, text embedding system 102 may generate candidate embeddings in an embedding space (e.g., embedding space 402). For example, embedder subsystem 116 may generate, in an embedding space, a first candidate embedding of the first semantic representation and a second candidate embedding of the second semantic representation. As an illustrative example, embedder subsystem 116 may utilize embedder 308 to generate vector representations of the generated semantic representations 306a-306n. For example, embedder subsystem 116 may generate data structures (e.g., arrays or vectors), where each element of the data structure is associated with a dimension (e.g., dimensions 404 or 406) in embedding space 402 that represents an abstract or concrete lexical, syntactic, or semantic axis. By generating embeddings associated with the generated semantic representations, text embedding system 102 enables direct comparisons between texts (e.g., for similarity or differences), thereby enabling text embedding system 102 to analyze a generated text in the context of a corpus of pre-existing texts, where all such texts are represented within the same embedding space.

For example, embedder 308, as shown in FIG. 3, may include a model, algorithm, module, or method for generating embeddings of data within an embedding space. As an illustrative example, embedder 308 may generate a vector representation of a document, data structure, or information that includes semantic information (e.g., a text file or a document in natural language). Embedder 308 may include natural language processing algorithms, such as word2vec or doc2vec, which enable conversion of words or sentences into a vector space (e.g., embedding space 402). An embedding generated by embedder 308 may include a vector of a particular number of dimensions defined within embedding space 402. For example, a word, phrase, sentence, or communication may be represented by one or more lists of numbers that are able to capture semantic or syntactic qualities of the verbal information.

By embedding generated semantic representations of textual information in a defined embedding space, embedder subsystem 116 enables analytical comparisons between different texts (e.g., of different lengths or of different data formats) by conversion to a uniform format defined by the embedding space. An embedding space may include a vector space or other abstract representative framework for representing the semantic, syntactic, or lexical information within an embedding. For example, a dimension of embedding space 402 may correspond to a real or abstract syntactic, lexical, or semantic quality of a corresponding embedding. In some embodiments, embedder subsystem 116 generates candidate embeddings corresponding to different candidate representations (e.g., semantic representations) of the input file (e.g., text file 302). Additionally, or alternatively, embedder subsystem 116 generates embeddings corresponding to pre-existing text files in a corpus or database of texts, such as for training of the embedding model or for comparison of a candidate embedding with embeddings of other pre-existing texts for further analysis and evaluation of the corresponding candidate embedding.

In some embodiments, text embedding system 102 may ensure that semantic representations generated by generative language model 304 are sufficiently distinct, based on determining a distance between the respective candidate embeddings in embedding space 402. For example, evaluation subsystem 118 may determine a first distance between the first candidate embedding and the second candidate embedding in the embedding space. Evaluation subsystem 118 may compare the first distance with a threshold similarity distance. Based on comparing the first distance with the threshold similarity distance, evaluation subsystem 118 may determine that the first distance is below the threshold similarity distance. Based on determining that the first distance is below the threshold similarity distance, evaluation subsystem 118 may provide the text file to the generative language model to cause the generative language model to generate a third semantic representation of the textual description. In some embodiments, a second distance between a third candidate embedding corresponding to the third semantic representation and the first candidate embedding is greater than the threshold similarity distance, and a third distance between the third candidate embedding and the second candidate embedding is greater than the threshold similarity distance.

As an illustrative example, embedder subsystem 116 may generate multiple candidate embeddings 310a-n each corresponding to the semantic representations 306a-n (e.g., multiple whitepapers corresponding to the same description of a chair). Evaluation subsystem 118 may determine a difference between these semantic representations 306a-n, using a distance between the multiple candidate embeddings 310a-n as a representation of this distance. By comparing this distance with a threshold similarity distance, evaluation subsystem 118 may determine whether the generated semantic representations (and corresponding candidate embeddings) are substantially similar to each other (e.g., include the same features or attributes), based on this distance. In the case of a determination that at least two semantic representations are indeed similar to each other based on this analysis, text generation subsystem 114 may generate another semantic representation and corresponding candidate embedding to ensure that a variety of representations of the input textual description are represented and generated, thereby improving the options available to the user (e.g., improving the variety of possible technical implementations of a given product).

For example, a distance as defined within the embedding space may include a quantification of a distance between two points (e.g., two positions representing embeddings)

within the embedding space, as demonstrated by distance 416 or radius 412 in FIG. 4. For example, a distance in embedding space 402 may include a Euclidean distance over any dimensions represented within embedding space 402. In some embodiments, rather than a distance, a cosine similarity is generated, indicating an angular separation between two embeddings with respect to the vertex of the angle corresponding to the origin of embedding space 402; in this case, a threshold angle may be compared with the angular separation to determine similarity or determine subsets of embeddings, as discussed further.

In some embodiments, text embedding system 102 may obtain embeddings associated with existing items. For example, embedder subsystem 116, using communication subsystem 112, may obtain a plurality of embeddings of semantic representations of text associated with a set of existing items. In some embodiments, each embedding of the plurality of embeddings is represented in the embedding space. As an illustrative example, communication subsystem 112 may retrieve (e.g., from third-party databases 108*a-n*) other text files relating to other items (e.g., other inventions, or other products) that are pre-existing/existing (e.g., are published in databases). Embedder subsystem 116 may embed these text files in embedding space 402, thereby enabling comparison between these other text files and the generated semantic representations of the textual description. For example, the semantic representations may represent simulated product reviews associated with a textual description of a product; these existing text files and corresponding embeddings may correspond to actual reviews for similar products, or other textual descriptions of the same products, as converted to a corresponding vector representation in the embedding space. In some embodiments, a given product may be associated with multiple textual descriptions (e.g., within different existing text files, or within the same text file). Embedder subsystem 116 may generate multiple embeddings based on these different product descriptions for the same product or existing item. As an illustrative example, embedder subsystem 116 may generate multiple embeddings associated with different product reviews covering the same product, with each product review covering different aspects of the same existing product. As such, text embedding system 102 enables evaluation of various aspects of existing products that are similar to aspects of the item associated with the provided text file (e.g., text file 302). By doing so, evaluation subsystem 118 enables evaluation of the inputted textual description in the context of other products or ideas that may be relevant.

For example, in some embodiments, communication subsystem 112 may obtain text files from a database and generate embeddings using an embedding model (e.g., embedder 308). For example, communication subsystem 112 may obtain, from a text file database, a plurality of text files associated with the set of existing items. Embedder subsystem 116 may provide the plurality of text files to an embedding model (e.g., embedder 308) to cause the embedding model to generate the plurality of embeddings. In some embodiments, each embedding of the plurality of embeddings corresponds to a corresponding text file of the plurality of text files. As an illustrative example, communication subsystem 112 may obtain text files associated with customer reviews for other products; accordingly, embedder subsystem 116 may represent these customer reviews with corresponding embeddings in the same embedding space as are represented by the candidate embeddings. Thus, text embedding system 102 enables direct comparison between generated candidate embeddings (e.g., corresponding to simulated or generated product reviews) and embeddings associated with previously published or generated texts.

In some embodiments, text embedding system 102 may determine subsets of embeddings within a threshold distance from the candidate embeddings. For example, evaluation subsystem 118 may determine a first subset of the plurality of embeddings that are within a threshold distance from the first candidate embedding within the embedding space and a second subset of the plurality of embeddings that are within the threshold distance from the second candidate embedding within the embedding space. As an illustrative example, evaluation subsystem 118 may determine which embeddings relating to existing items, ideas, or products are similar syntactically, lexically, or semantically to those generated on the basis of the textual description of text file 302. As an illustrative example, a text file describing a chair (e.g., as shown in FIG. 2 as textual description 202), may be associated with other embeddings corresponding to descriptions of existing chairs on the market; evaluation subsystem 118 may identify a subset of those embeddings that are within a given threshold distance from a candidate embedding to determine analogs to the description of text file 302. Similarly, evaluation subsystem 118 may determine a subset of embeddings for each semantic representation (e.g., each generated whitepaper of the chair, or each generated simulated product review for the chair) generated by generative language model 304. For example, evaluation subsystem 118 may determine a subset size for each subset of embeddings, where the subset size indicates a number of other embeddings that are similar to the candidate embedding to within the threshold distance in embedding space 402. By doing so, text embedding system 102 enables analysis of which candidate embeddings (and corresponding semantic representations) have more prior interest or innovation than others.

In some embodiments, communication subsystem 112 may request updates to the database of text files, thereby continually or periodically updating the embeddings within the embedding space based on new information. For example, communication subsystem 112 may transmit, to the text file database (e.g., a third-party database 108*a*-108*n*), a query for an updated plurality of text files. Communication subsystem 112 may obtain the updated plurality of text files from the text file database. Text embedding system 102 may provide the updated plurality of text files to the embedding model (e.g., embedder 308) to cause the embedding model to generate an updated plurality of embeddings. In some embodiments, each embedding of the updated plurality of embeddings corresponds to a corresponding file of the updated plurality of text files. Embedder subsystem 116 may update the first subset and the second subset to include one or more embeddings of the updated plurality of embeddings. As such, evaluation subsystem 118 enables text embedding system 102 to stay up to date with respect to other texts that emerge—for example embedder subsystem 116 may subsequently embed newly written product reviews from a database of product reviews, even if such product reviews were not available or published previously.

In some embodiments, evaluation subsystem 118 may determine the threshold distance based on a threshold density within a region of embedding space 402. For example, text embedding system 102 may obtain a threshold density. In some embodiments, the threshold density indicates a threshold number of embeddings per unit volume of the embedding space. Embedder subsystem 116 may determine a first spherical volume in the embedding space around the first candidate embedding. In some embodiments, the first spherical volume is characterized by the threshold density. Embedder subsystem 116 may determine the threshold distance based on a radius of the first spherical volume in the embedding space. As an illustrative example, embedder subsystem 116 may change the threshold distance under which embeddings are considered to be similar enough to a candidate embedding to be relevant, where this threshold distance may be set by a pre-determined threshold density to be reached within the space around a given embedding. For example, embedder subsystem 116 may determine that none of the candidate embeddings are near any embeddings in a region within the original threshold distance; embedder subsystem 116 may increase the threshold distance until a certain number of embeddings are within the threshold distance. Additionally, or alternatively, embedder subsystem 116 may increase the threshold distance to a value where a region corresponding to a spherical volume with the threshold distance as its radius (e.g., as represented by radius 412 and circular projection 414 in FIG. 4) has a density above a particular threshold value. By doing so, evaluation subsystem 118 may ensure that a sufficient number of analogous embeddings are determined for at least one of the generated candidate embeddings.

In some embodiments, text embedding system 102 may compare the subsets of embeddings determined. For example, evaluation subsystem 118 may compare the first subset with the second subset, such as to determine which subset is associated with a greater number of embeddings (e.g., has a greater size) within the threshold distance. As an illustrative example, text generation subsystem 114 may generate a first semantic representation corresponding to the first candidate embedding, where this first semantic representation of the textual description includes a positive product review for a described product. Similarly, text generation subsystem 114 may generate a second semantic representation that corresponds to the second candidate embedding, which may be associated with a negative product review for the same described product. Evaluation subsystem 118 may determine that the second candidate embedding is similar to a greater number of embeddings corresponding to previously published negative reviews, while the first candidate embedding is associated with fewer embeddings (e.g., fewer similar positive reviews). By comparing these subsets of embeddings, evaluation subsystem 118 enables evaluation of the described item with respect to a corpus of texts that have already been published.

In some embodiments, text embedding system 102, through evaluation subsystem 118, may determine attributes associated with a candidate embedding based on the comparison. For example, based on comparing the first subset with the second subset, evaluation subsystem 118 may determine one or more attributes associated with the first candidate embedding. As an illustrative example, evaluation subsystem 118 may determine that the negative reviews associated with similar existing items all include complaints that the legs of a corresponding chair are too rounded. In response, evaluation subsystem 118 may determine an attribute associated with these negative reviews (e.g., "rounded legs") for further consideration and modification of the textual description of the item.

An attribute may include any feature or element, such as a lexical/syntactic/semantic element, associated with an embedding, or an associated semantic representation of the embedding. For example, an attribute may include a noun, adjective, or other word, such as a color or a description of a function of an item; alternatively, an attribute may include a natural language token (e.g., a semantic token) that represents a meaningful unit. By identifying attributes within embeddings within embedding space 402, text embedding system 102 may obtain information for further modification of the textual description of the item based on the requirements or desires of a corresponding user. For example, text embedding system 102 enables identification of attributes to avoid or emphasize within the textual description (e.g., to reduce the incidence of negative reviews associated with similar products, or to increase the ratio of likely positive reviews associated with similar products).

In some embodiments, evaluation subsystem 118 may determine that the first subset and the second subset have the same size. In response, evaluation subsystem 118 may vary the threshold distance to generate updated subsets (e.g., representing a new set of embeddings within the updated threshold distance from respective candidate embeddings). For example, based on comparing the first subset with the second subset, evaluation subsystem 118 may determine that the first subset and the second subset are of a same size. Based on determining that the first subset and the second subset are of the same size, evaluation subsystem 118 may determine an updated threshold distance. Evaluation subsystem 118 may determine an updated first subset and an updated second subset based on the updated threshold distance. Evaluation subsystem 118 may compare the updated first subset with the updated second subset. Based on comparing the updated first subset with the updated second subset, evaluation subsystem 118 may determine the one or more attributes associated with the first candidate embedding. As an illustrative example, these updated subsets may respectively include a different number of embeddings, thereby enabling a comparison and subsequent determination of attributes to avoid or include.

Figure 5:
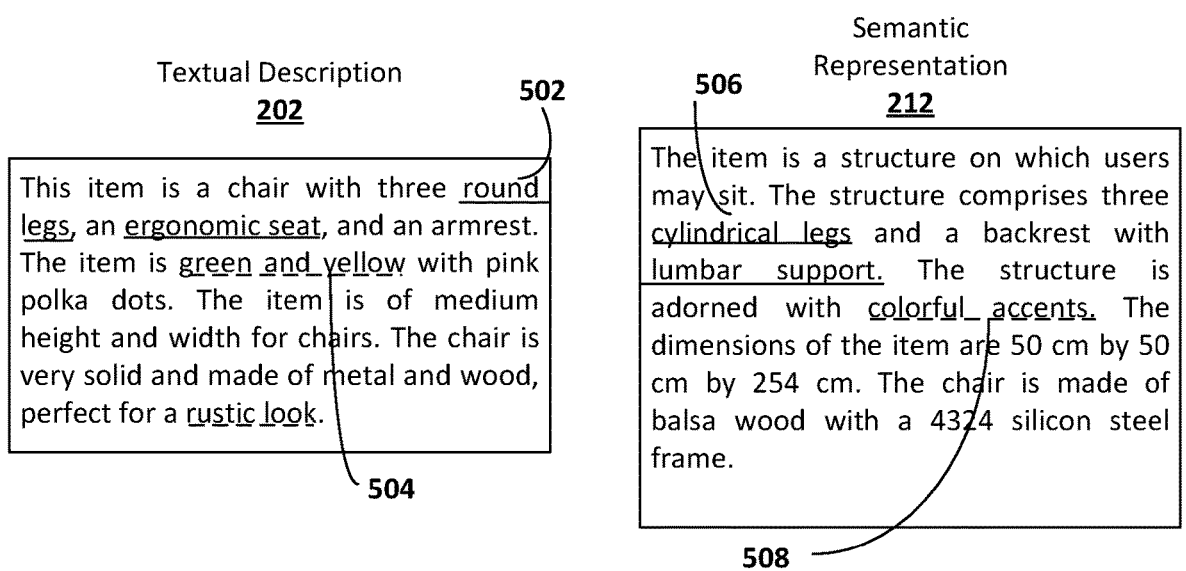
FIG. 5 shows an illustrative schematic that illustrates attention weights associated with semantic representations, in accordance with one or more embodiments.

FIG. 5 shows illustrative schematic 500 that illustrates attention weights 510 associated with semantic representations (e.g., semantic representation 212), in accordance with one or more embodiments. For example, FIG. 5 identifies semantic tokens (e.g., semantic tokens 502, 504, 506, or 508) that are associated with attributes of textual description 202 or semantic representation 212. For example, attention weights 510 may represent weight values 514 corresponding to semantic tokens 512. By determining attention weights associated with generated semantic representations of textual descriptions, text embedding system 102 enables analysis of attributes of the textual descriptions on which semantic representations focus, for evaluation and tuning of the textual description.

In some embodiments, text embedding system 102 through evaluation subsystem 118 may generate attention weights associated with the candidate embedding, where the attention weights are associated with semantic tokens in the text file. For example, evaluation subsystem 118 may generate a set of attention weights associated with the first candidate embedding. In some embodiments, the set of attention weights includes a set of values corresponding to a set of semantic tokens associated with the text file. Evaluation subsystem 118 may determine a first semantic token associated with a first attention weight of the set of attention weights. Evaluation subsystem 118 may generate the one or more attributes to include the first semantic token. As an illustrative example, evaluation subsystem 118 may generate attention weights 510 such that semantic tokens 512 associated with textual description 202 are provided with corresponding weight values 514 that indicate the presence or significance of these semantic tokens within semantic representation 212. For example, attention weights 510 may specify that a word or phrase (e.g., "round legs" as shown in semantic token 502) is significantly represented in semantic representation 212 (and the corresponding candidate embedding). For example, semantic representation 212 describes cylindrical legs (e.g., semantic token 506) for the chair; as such, evaluation subsystem 118 may compute a relatively high weight value for the semantic token corresponding to "round legs." In contrast, the phrase "rustic look" does not appear represented within semantic representation 212. As such, evaluation subsystem 118 may compute a relatively low weight value for this attribute. Moreover, evaluation subsystem 118 may generate attributes corresponding to these weights according to the given semantic representation (e.g., an attribute that corresponds to a semantic token identified with a high weight value). By doing so, evaluation subsystem 118 enables text embedding system 102 to evaluate salient features of texts generated by generative language model 304 and further update the text file (e.g., the textual description) according to these identified features.

In some embodiments, text embedding system 102 through evaluation subsystem 118 may enable a user to select semantic tokens for selection of the one or more attributes. For example, evaluation subsystem 118 may determine a subset of the set of attention weights and a corresponding subset of semantic tokens of the set of semantic tokens. In some embodiments, each attention weight of the subset of the set of attention weights is greater than a threshold weight. Text embedding system 102, through communication subsystem 112, may generate, for display on a user interface associated with a user, the corresponding subset of semantic tokens. Communication subsystem 112 may receive, via the user interface, a selection of the first semantic token. As an illustrative example, evaluation subsystem 118 may determine a subset of attention weights with values above a threshold value, which correspond to semantic tokens that are emphasized within a given semantic representation of the input text file. For example, communication subsystem 112 may display semantic tokens 512 that are associated with weight values 514 greater than a given value (e.g., greater than 0.3) and enable a user to select one or more of these semantic tokens for further determination of corresponding attributes. A user may select "green and yellow" (e.g., semantic token 504), associated with token 508 within semantic representation 212. Based on this selection, evaluation subsystem 118 may determine a corresponding attribute for further analysis and tuning of the text file (e.g., an attribute associated with "colors").

An attention weight may include a value associated with attention (e.g., a machine learning-based attention). In some embodiments, each embedding (e.g., a semantic token) is associated with weights (e.g., "soft" weights that are able to vary during runtime of the large language model). For example, generative language model 304 may include multiple attention heads that are capable of attention for multiple features. For example, text embedding system 102 may leverage multi-head attention algorithms, whereby different parts of the sequence of semantic tokens associated with a given semantic representation are evaluated in parallel for generation of attention weights. For example, different attention heads may focus on shorter-range or longer-range features within a sequence of semantic tokens, thereby enabling evaluation of different semantic features within a given semantic representation of the item and the corresponding candidate embedding. By generating attention weights for semantic tokens within the semantic representations, text embedding system 102 may identify salient features of such representations, enabling selection and tuning of the textual description according to such identified features, which may differ between different semantic representations of the same textual description.

In some embodiments, text embedding system 102 may generate an updated text file based on the determined attributes. For example, text editing subsystem 120 may generate, based on the text file and the one or more attributes, an updated text file. In some embodiments, the updated text file includes an updated textual description based on one or more updated semantic tokens that describe the one or more attributes. As an illustrative example, text editing subsystem 120 may provide the determined attributes (e.g., features associated with tokens) to generative language model 304 in order to update or tune the text file to include or avoid such features. For example, text editing subsystem 120 may determine attributes associated with candidate embeddings with a greater number of embeddings within the threshold distance in the embedding space and generate an updated text to focus on such attributes. Alternatively, or additionally, text editing subsystem 120 may generate the updated text file to de-emphasize such attributes or emphasize/de-emphasize attributes for the candidate embedding with a lesser number of embeddings within the threshold distance in the embedding space. For example, text editing subsystem 120 may generate an updated text to describe the round legs of textual description 202 (e.g., by including specification of the diameter or curvature of the legs), if similarity to a particular semantic representation in a highly populated region of the embedding space is desired. By doing so, text embedding system 102 enables modification and improvements to descriptions of items (e.g., product descriptions) based on a corpus of text associated with other similar items (e.g., based on popularity or quality of customer reviews of each of these texts).

In some embodiments, generating the updated text file may include generating a prompt for input to generative language model 304 for generation of the new text file. For example, text editing subsystem 120 may generate a set of semantic tokens associated with the one or more attributes. Text editing subsystem 120 may generate a prompt for the generative language model. In some embodiments, the prompt includes the set of semantic tokens. Text editing subsystem 120 may provide the prompt to the generative language model to cause the generative language model to generate an updated textual description for the updated text file. As an illustrative example, text editing subsystem 120 may generate a prompt based on the previously determined attributes for input to an LLM for generating an updated text file. For example, the prompt may include instructions to include elements, such as "update the following text to expound upon the round legs of the chair." Additionally, or alternatively, the prompt may include instructions to avoid elements, such as "update the following text to de-emphasize the round legs of the chair." By doing so, text embedding system 102 enables tuning of the description to increase the similarity of the item with items previously described in a corpus of related texts (or, conversely, decrease the similarity).

In some embodiments, text embedding system 102 may iteratively generate further improvements to the textual description based on analysis of further semantic representations of the updated text file. For example, text embedding system 102 may provide the updated text file to the generative language model. Based on providing the updated text file to the generative language model, text embedding system 102 may generate, in the embedding space, a third candidate embedding of a third semantic representation of the updated text file. Text embedding system 102 may determine that a third subset of embeddings of the plurality of embeddings is smaller than the first subset and the second subset. In some embodiments, the third subset includes embeddings that are within the threshold distance from the third candidate embedding within the embedding space. Text embedding system 102 may generate a set of semantic tokens associated with a set of attributes associated with the third candidate embedding. Text embedding system 102 may provide the set of attributes to the generative language model to cause the generative language model to generate an output including an updated description of the item based on the third semantic representation. As an illustrative example, text embedding system 102 may generate an updated description of an item (e.g., a chair) to emphasize a particular feature (e.g., round legs) based on determination of other similar, popular products with this feature. Text embedding system 102 may provide this updated description to generative language model 304 to generate further candidate embeddings, for further generation of representations of the updated description that may be even more popular (e.g., with more associated positive customer reviews) and further tuning of the description accordingly.

In some embodiments, text embedding system 102 may generate the text file to emphasize attributes of a candidate embedding with fewer other embeddings within a threshold distance in the embedding space than for other candidate embeddings. For example, based on comparing the first subset with the second subset, text embedding system 102 may determine that the first subset is smaller than the second subset. Based on determining that the first subset is smaller than the second subset, text embedding system 102 may generate the updated text file to include semantic tokens that describe the one or more attributes associated with the first candidate embedding. As an illustrative example, text embedding system 102 may generate an updated description to emphasize features of a semantic representation that is more likely to be unique (e.g., has fewer other analogous texts embedded within the embedding space within a threshold distance). For example, text embedding system 102 may generate a description of a product that is not similar to previous products on the market (for which descriptions have been embedded within the embedding space) based on attributes associated with the corresponding semantic representation. As such, text embedding system 102 may enable product designers or inventors to generate newer ideas based on their similarities with other texts of the corpus of text.

In some embodiments, text embedding system 102 may generate an updated text file to de-emphasize attributes of a candidate embedding with fewer other embeddings within a threshold distance in the embedding space than for other candidate embeddings. For example, based on comparing the first subset with the second subset, text embedding system 102 may determine that the first subset is smaller than the second subset. Based on determining that the first subset is smaller than the second subset, text embedding system 102 may generate the updated text file. In some embodiments, the updated text file lacks semantic tokens in the text file that describe the one or more attributes associated with the first candidate embedding. As an illustrative example, text embedding system 102 may generate an updated description to de-emphasize features of a semantic representation that is more likely to be unique (e.g., has fewer other analogous texts embedded within the embedding space within a threshold distance). For example, text embedding system 102 may generate a description of a product that avoids subject matter that is not similar to previous products on the market (for which descriptions have been embedded within the embedding space) based on avoiding attributes associated with the corresponding semantic representation. As such, text embedding system 102 may enable product designers to avoid ideas that may lead to unpopular or inoperable products.

In some embodiments, text embedding system 102 may generate an updated text file to emphasize attributes of a candidate embedding with a greater number of other embeddings within a threshold distance in the embedding space than for other candidate embeddings. For example, based on comparing the first subset with the second subset, text embedding system 102 may determine that the second subset is smaller than the first subset. Based on determining that the second subset is smaller than the first subset, text embedding system 102 may generate the updated text file to include semantic tokens that describe the one or more attributes associated with the first candidate embedding. As an illustrative example, text embedding system 102 may generate an updated description to emphasize features of a semantic representation with many other analogous previous texts (e.g., has a greater number of analogous texts embedded within the embedding space within a threshold distance). For example, text embedding system 102 may generate a description of a product that emphasizes subject matter that is similar to other previous products on the market (e.g., for which descriptions have been embedded within the embedding space) based on emphasizing attributes associated with the corresponding semantic representation. As such, text embedding system 102 may enable product designers to generate ideas based on other previously published successful products.

In some embodiments, text embedding system 102 may generate an updated text file to de-emphasize attributes of a candidate embedding with a greater number of other embeddings within a threshold distance in the embedding space than for other candidate embeddings. For example, based on comparing the first subset with the second subset, text embedding system 102 may determine that the second subset is smaller than the first subset. Based on determining that the second subset is smaller than the first subset, text embedding system 102 may generate the updated text file. In some embodiments, the updated text file lacks semantic tokens in the text file that describe the one or more attributes associated with the first candidate embedding. As an illustrative example, text embedding system 102 may generate an updated description to de-emphasize features of a semantic representation with many other analogous previous texts (e.g., has a greater number of analogous texts embedded within the embedding space within a threshold distance). For example, text embedding system 102 may generate a description of a product that de-emphasizes subject matter that is similar to other previous products on the market (e.g., for which descriptions have been embedded within the embedding space) based on avoiding attributes associated with the corresponding semantic representation. As such, text embedding system 102 enables product designers to generate ideas to avoid previous products for which product descriptions have been published (e.g., to generate a unique product).

Figure 6:
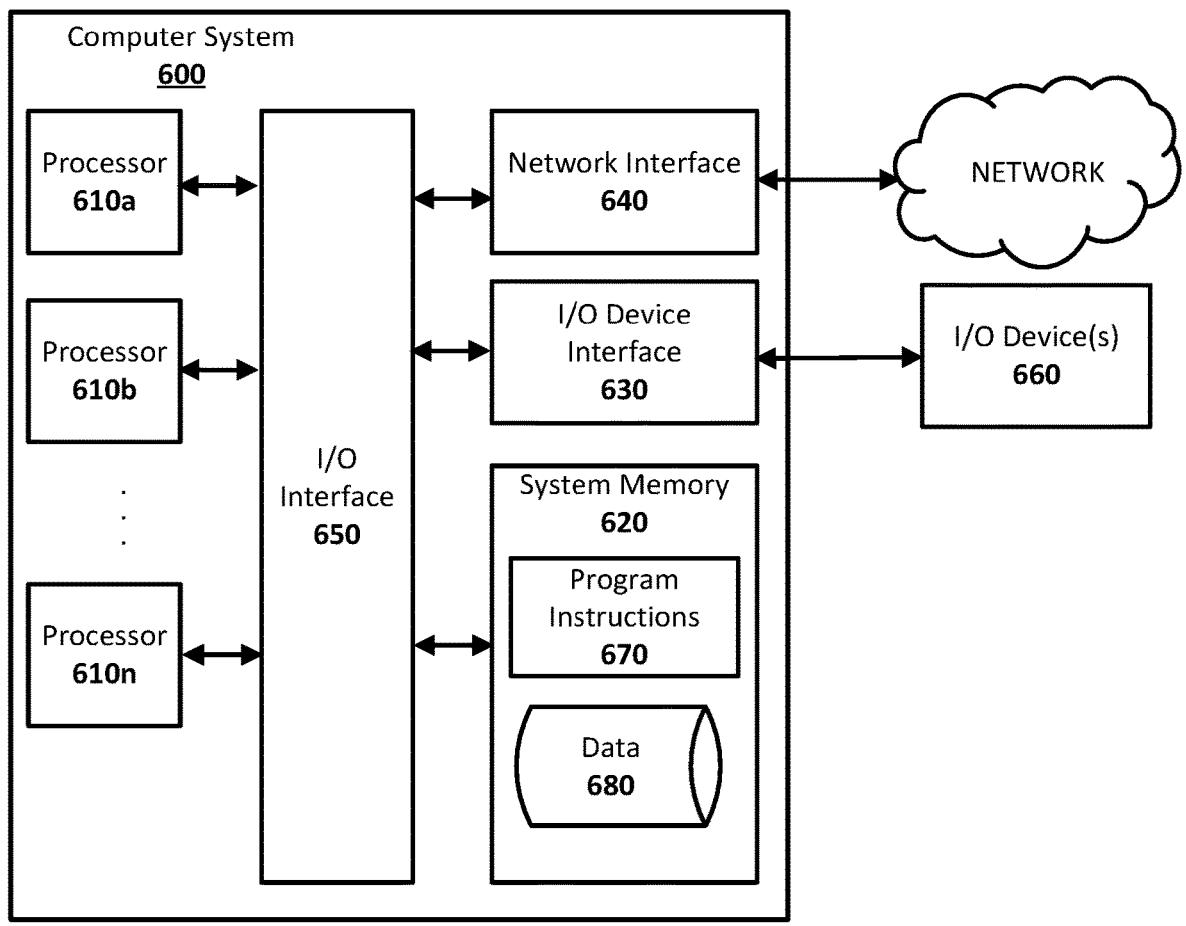
FIG. 6 shows an example computing system that may be used in accordance with one or more embodiments.

FIG. 6 shows an example computing system that may be used in accordance with some embodiments of this disclosure. In some instances, computing system 600 is referred to as a computer system 600. A person skilled in the art would understand that those terms may be used interchangeably.

The components of FIG. 6 may be used to perform some or all operations or generate, transmit, or handle all data discussed in relation to FIGS. 1-6. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., processors 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special purpose logic circuitry, for example, an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, read-only memory (ROM), programmable ROM (PROM), erasable PROM (EPROM), or electrically EPROM (EEPROM)), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory, computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a global positioning system (GPS), or the like. Computer system 600 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Figure 7:
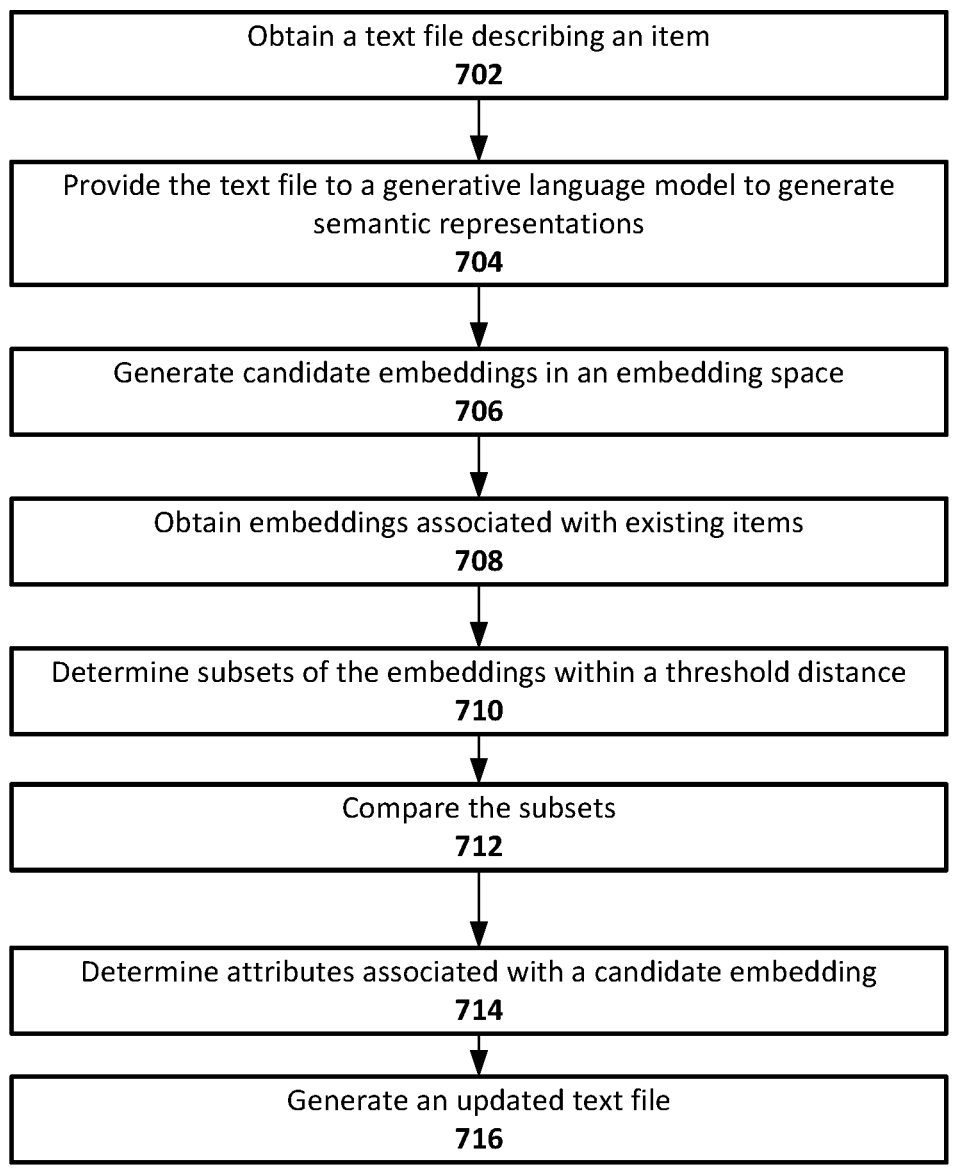
FIG. 7 shows a flowchart of the operations involved in updated textual descriptions of items based on generated semantic embeddings, in accordance with one or more embodiments.

FIG. 7 shows a flowchart of the operations involved in updated textual descriptions of items based on generated semantic embeddings, in accordance with one or more embodiments. For example, process 700 enables computer system 600 to update textual descriptions of items (e.g., products) based on an analysis of other previously published texts of similar items. For example, computer system 600 enables the generation of updated textual descriptions of items to avoid or emphasize features of previously published texts based on generated candidate embeddings within an embedding space.

At 702, text embedding system 102 (e.g., using one or more components described above) enables computer system 600 to obtain a text file. For example, computer system 600, through I/O device interface 630 or network interface 640, may obtain a text file including a textual description of an item. For example, the text file may include a description of an object, product, or service, such as a financial product (e.g., a credit card or a website's user interface). In some embodiments, text embedding system 102 may obtain other representations, such as descriptions, illustrations (e.g., images), and other media relating to inventions. By obtaining such information, text embedding system 102 may generate, modify, or tune such descriptions according to features of other existing corresponding texts. Computer system 600 may store the text file as data 680 within system memory 620 through I/O interface 650.

At 704, text embedding system 102 (e.g., using one or more components described above) enables computer system 600 to generate semantic representations of the textual description. For example, computer system 600 may provide the text file (e.g., through I/O interface 650) to a generative language model to cause the generative language model to generate a first semantic representation of the textual description and a second semantic representation of the textual description different from the first semantic representation. In some embodiments, the generative language model is trained to generate semantic representations based on text files. As an illustrative example, computer system 600 may provide a description of the text file that corresponds to an item to an LLM, along with a prompt that specifies a transformation or specification for the generated semantic representation. For example, the prompt may specify the generation of a synthetic product review for the item on the basis of the item's description. Text embedding system 102 may generate a set of textual representations of the item described within the text file according to the prompt provided to the LLM. For example, text embedding system 102 may generate a set of synthetic product reviews that simulate a customer's reaction to the described item. In some embodiments, each of these semantic representations (e.g., product reviews) may include a different focus or theme. For example, one or more of the generated product reviews may simulate negative reviews, while another generated product review may simulate positive reviews for the same item. By doing so, text embedding system 102 may generate representations of the item's description that capture semantic information associated with the item, while enhancing the item's comparability with other existing items. For example, computer system 600 may utilize program instructions 670 stored in system memory 620 to execute a process through processors 610*a-n* in order to generate the semantic representations using a generative language model whose model weights are stored within system memory 620. Additionally, or alternatively, computer system 600 may store the semantic representations within a data structure within system memory 620.

At 706, text embedding system 102 (e.g., using one or more components described above) enables computer system 600 to generate candidate embeddings based on the semantic representations. For example, computer system 600 may generate, in an embedding space, a first candidate embedding of the first semantic representation and a second candidate embedding of the second semantic representation. As an illustrative example, computer system 600 may generate data structures, such as vectors, that represent the semantic information within the generated semantic representations. For example, text embedding system 102 may represent each word of a generated product review in a vector space, with axes representing semantic information (e.g., through a word2vec algorithm). By doing so, computer system 600 enables comparisons between the generated semantic representations, as well as other textual data (e.g., as related to other existing items). Computer system 600 may generate the candidate embeddings within the embedding space by generating vectors stored as data 680 within system memory 620 (e.g., generated using processors 610*a-n*).

At 708, text embedding system 102 (e.g., using one or more components described above) enables computer system 600 to obtain embeddings of semantic representations of other texts associated with existing items. For example, computer system 600 may obtain a plurality of embeddings of semantic representations of text associated with a set of existing items. In some embodiments, each embedding of the plurality of embeddings is represented in the embedding space. As an illustrative example, computer system 600 may obtain a textual description corresponding to other existing items, such as product specifications, product reviews, or patents associated with other associated products. Based on these descriptions, text embedding system 102 may obtain embeddings (e.g., by generating vector representations of these descriptions of the existing items) and generate these within the same embedding space as for the generated semantic representations. By doing so, text embedding system 102 enables comparisons between the item in question and other existing items, for further analysis, modification, or tuning of the item or the corresponding description. For example, computer system 600 may receive, from a network through network interface 640, a set of texts associated with existing items and store these texts within system memory 620. Computer system 600 may generate embeddings of these items using program instructions 670 through processors 610$a$-$n$ and store these embeddings within system memory 620.

At 710, text embedding system 102 (e.g., using one or more components described above) enables computer system 600 to determine subsets of embeddings that are within a threshold distance from corresponding candidate embeddings. For example, computer system 600 may determine a first subset of the plurality of embeddings that are within a threshold distance from the first candidate embedding within the embedding space and a second subset of the plurality of embeddings that are within the threshold distance from the second candidate embedding within the embedding space. As an illustrative example, computer system 600 may determine distances between each embedding of the plurality of embeddings and the generated candidate embeddings to determine which of these embeddings are close to a candidate embedding in distance, within the embedding space. By identifying such embeddings corresponding to existing items (e.g., existing product reviews of similar items), text embedding system 102 may determine analogs associated with the item in question (e.g., the item associated with the input text file). For example, computer system 600 may determine a set of embeddings associated with many positive customer reviews of a product that are semantically near one or more of the candidate embeddings, thereby indicating a level of popularity of existing items associated with these embeddings. For example, computer system 600 may utilize program instructions 670 and processors 610$a$-610$n$ to determine a set of embeddings stored in data 680 that are within a threshold distance from the candidate embeddings. Computer system 600 may store these embeddings within a data structure in system memory 620 (e.g., as data 680).

At 712, text embedding system 102 (e.g., using one or more components described above) enables computer system 600 to compare subsets of embeddings. As an illustrative example, text embedding system 102 may compare a number of embeddings that are within a threshold distance from a given candidate embedding with a number of embeddings that are within the threshold distance of another candidate embedding. In some embodiments, the comparison may include a comparison of attributes associated with the embeddings associated with the different candidate embeddings. By doing so, text embedding system 102 may compile information associated with different candidate embeddings in order to evaluate the corresponding generated semantic representations (e.g., product reviews) according to attributes or statistics associated with similar existing items. For example, computer system 600 may utilize processors 610$a$-610$n$ to compare the first subset with the second subset (e.g., according to instructions or algorithms stored as program instructions 670 within system memory 620).

At 714, text embedding system 102 (e.g., using one or more components described above) enables computer system 600 to determine attributes of the first candidate embedding for tuning the textual description based on a comparison of the subsets. For example, based on comparing the first subset with the second subset, computer system 600 may determine one or more attributes associated with the first candidate embedding. As an illustrative example, text embedding system 102 may compare a number of embeddings within the threshold distance of the generated candidate embeddings. For example, the embeddings corresponding to the existing items may include embeddings associated with positive or negative customer reviews of existing products. The generated candidate embeddings may include embeddings associated with synthetic product reviews generated on the basis of the item corresponding to the text file, with variations of features that are emphasized within each synthetic product review. Text embedding system 102 may determine which of these candidate embeddings are near embeddings of existing items that are associated with a greater number of existing reviews, as well as whether the attributes of these existing reviews are more or less favorable than for the embeddings near the other candidate embeddings. By doing so, text embedding system 102 enables evaluation of descriptions of items within the context of other descriptions of similar items, as well as an analysis of associated attributes. For example, computer system 600 may utilize program instructions 670 and processors 610$a$-$n$ to determine attributes associated with the first candidate embedding and store these attributes within system memory 620 (e.g., as data 680), through I/O interface 650.

At 716, text embedding system 102 (e.g., using one or more components described above) enables computer system 600 to generate an updated text file based on these attributes. As an illustrative example, based on the comparison, text embedding system 102 may generate a description to enhance attributes of the description associated with the text file, or avoid other attributes, based on the nature of the embeddings near the generated candidate embeddings in the embedding space. For example, based on the semantic representations (e.g., synthetic product reviews) corresponding to the candidate embeddings, as well as attributes associated with product reviews of existing, similar items, the system may determine attributes of the item that are likely to lead to more positive reviews than negative reviews. Text embedding system 102 may integrate these attributes (or avoid these attributes) within a modified textual description of the item to improve the likelihood of the item to be associated with positive product reviews, thereby improving the effectiveness of the item's textual description. For example, computer system 600 may generate, based on the text file and the one or more attributes, an updated text file. Computer system 600 may utilize program instructions 670 and processors 610$a$-$n$ through I/O interface 650 (e.g., by generating a prompt and providing this prompt to a generative language model). Computer system 600 may store the updated text file within system memory 620 as data 680.

It is contemplated that the operations or descriptions of FIG. 7 may be used with any other embodiment of this disclosure. In addition, the operations and descriptions described in relation to FIG. 7 may be done in alternative orders or in parallel to further the purposes of this disclosure. For example, each of these operations may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising receiving a text file comprising one or more semantic tokens for a textual description of an item, providing the text file to a generative language model to cause the generative language model to generate a first semantic representation of the textual description and a second semantic representation of the textual description different from the first semantic representation, wherein the generative language model has been trained to generate semantic representations based on text files, generating, in an embedding space, a first candidate embedding of the first semantic representation and a second candidate embedding of the second semantic representation, obtaining a plurality of embeddings of semantic representations of text associated with a set of existing items, wherein each embedding of the plurality of embeddings is represented in the embedding space, determining a first subset and a second subset of the plurality of embeddings, the first subset comprising embeddings that are within a threshold distance from the first candidate embedding within the embedding space and the second subset comprising embeddings that are within the threshold distance from the second candidate embedding within the embedding space, in response to determining that the first subset is smaller than the second subset, determining one or more attributes associated with the first candidate embedding, and generating, based on the text file and the one or more attributes, an updated text file, wherein the updated text file includes an updated textual description based on one or more updated semantic tokens that describe the one or more attributes.

2. A method comprising obtaining a text file comprising a textual description of an item, providing the text file to a generative language model to cause the generative language model to generate a first semantic representation of the textual description and a second semantic representation of the textual description different from the first semantic representation, wherein the generative language model is trained to generate semantic representations based on text files, generating, in an embedding space, a first candidate embedding of the first semantic representation and a second candidate embedding of the second semantic representation, obtaining a plurality of embeddings of semantic representations of text associated with a set of existing items, wherein each embedding of the plurality of embeddings is represented in the embedding space, determining a first subset of the plurality of embeddings that are within a threshold distance from the first candidate embedding within the embedding space and a second subset of the plurality of embeddings that are within the threshold distance from the second candidate embedding within the embedding space, comparing the first subset with the second subset, based on comparing the first subset with the second subset, determining one or more attributes associated with the first candidate embedding, and generating, based on the text file and the one or more attributes, an updated text file.

3. A method comprising obtaining a text file comprising a textual description of an item, providing the text file to a generative language model to cause the generative language model to generate a first semantic representation of the textual description and a second semantic representation of the textual description different from the first semantic representation, wherein the generative language model is trained to generate semantic representations based on text files, generating, in an embedding space, a first candidate embedding of the first semantic representation and a second candidate embedding of the second semantic representation, obtaining a plurality of embeddings of semantic representations of text associated with a set of existing items, wherein each embedding of the plurality of embeddings is represented in the embedding space, determining a first subset and a second subset of the plurality of embeddings, the first subset comprising embeddings that are within a threshold distance from the first candidate embedding within the embedding space, and the second subset comprising embeddings that are within the threshold distance from the second candidate embedding within the embedding space, based on determining that the first subset is larger than the second subset, determining one or more attributes associated with the first candidate embedding, and generating, based on providing the text file and the one or more attributes to the generative language model, an updated text file.

4. The method of any one of the preceding embodiments, further comprising providing the updated text file to the generative language model, based on providing the updated text file to the generative language model, generating, in the embedding space, a third candidate embedding of a third semantic representation of the updated text file, determining that a third subset of embeddings of the plurality of embeddings is smaller than the first subset and the second subset, wherein the third subset comprises embeddings that are within the threshold distance from the third candidate embedding within the embedding space, generating a set of semantic tokens associated with a set of attributes associated with the third candidate embedding, and providing the set of attributes to the generative language model to cause the generative language model to generate an output comprising an updated description of the item based on the third semantic representation.

5. The method of any one of the preceding embodiments, wherein determining the one or more attributes comprises generating a set of attention weights associated with the first candidate embedding, wherein the set of attention weights comprises a set of values corresponding to a set of semantic tokens associated with the text file, determining a first semantic token associated with a first attention weight of the set of attention weights, and generating the one or more attributes to include the first semantic token.

6. The method of any one of the preceding embodiments, wherein determining the first semantic token associated with the first attention weight of the set of attention weights comprises determining a subset of the set of attention weights and a corresponding subset of semantic tokens of the set of semantic tokens, wherein each attention weight of the subset of the set of attention weights is greater than a threshold weight, generating, for display on a user interface associated with a user, the corresponding subset of semantic tokens, and receiving, via the user interface, a selection of the first semantic token.

7. The method of any one of the preceding embodiments, further comprising obtaining a threshold density, wherein the threshold density indicates a threshold number of embeddings per unit volume of the embedding space, determining a first spherical volume in the embedding space around the first candidate embedding, wherein the first spherical volume is characterized by the threshold density, and determining the threshold distance based on a radius of the first spherical volume in the embedding space.

8. The method of any one of the preceding embodiments, wherein obtaining the plurality of embeddings comprises obtaining, from a text file database, a plurality of text files associated with the set of existing items, and providing the plurality of text files to an embedding model to cause the embedding model to generate the plurality of embeddings, wherein each embedding of the plurality of embeddings corresponds to a corresponding text file of the plurality of text files.

9. The method of any one of the preceding embodiments, further comprising transmitting, to the text file database, a query for an updated plurality of text files, obtaining the updated plurality of text files from the text file database, providing the updated plurality of text files to the embedding model to cause the embedding model to generate an updated plurality of embeddings, wherein each embedding of the updated plurality of embeddings corresponds to a corresponding file of the updated plurality of text files, and updating the first subset and the second subset to include one or more embeddings of the updated plurality of embeddings.

10. The method of any one of the preceding embodiments, further comprising obtaining a plurality of training text files and a plurality of training semantic representations, wherein each training semantic representation of the plurality of training semantic representations is associated with a corresponding training text file of the plurality of training text files, generating a plurality of training semantic token vectors, wherein each training semantic token vector of the plurality of training semantic token vectors represents the corresponding training text file of the plurality of training text files using semantic tokens, and providing a training dataset to the generative language model to train the generative language model to generate semantic representations, wherein the training dataset comprises the plurality of training semantic token vectors and the plurality of training semantic representations.

11. The method of any one of the preceding embodiments, wherein generating the updated text file comprises generating a set of semantic tokens associated with the one or more attributes, generating a prompt for the generative language model, wherein the prompt includes the set of semantic tokens, and providing the prompt to the generative language model to cause the generative language model to generate an updated textual description for the updated text file.

12. The method of any one of the preceding embodiments, further comprising determining a first distance between the first candidate embedding and the second candidate embedding in the embedding space, comparing the first distance with a threshold similarity distance, based on comparing the first distance with the threshold similarity distance, determining that the first distance is below the threshold similarity distance, and based on determining that the first distance is below the threshold similarity distance, providing the text file to the generative language model to cause the generative language model to generate a third semantic representation of the textual description, wherein a second distance between a third candidate embedding corresponding to the third semantic representation and the first candidate embedding is greater than the threshold similarity distance and a third distance between the third candidate embedding and the second candidate embedding is greater than the threshold similarity distance.

13. The method of any one of the preceding embodiments, further comprising, based on comparing the first subset with the second subset, determining that the first subset and the second subset are of a same size, based on determining that the first subset and the second subset are of the same size, determining an updated threshold distance, determining an updated first subset and an updated second subset based on the updated threshold distance, comparing the updated first subset with the updated second subset, and based on comparing the updated first subset with the updated second subset, determining the one or more attributes associated with the first candidate embedding.

14. The method of any one of the preceding embodiments, further comprising, based on comparing the first subset with the second subset, determining that the first subset is smaller than the second subset, and based on determining that the first subset is smaller than the second subset, generating the updated text file to include semantic tokens that describe the one or more attributes associated with the first candidate embedding.

15. The method of any one of the preceding embodiments, further comprising, based on comparing the first subset with the second subset, determining that the first subset is smaller than the second subset, and based on determining that the first subset is smaller than the second subset, generating the updated text file, wherein the updated text file lacks semantic tokens in the text file that describe the one or more attributes associated with the first candidate embedding.

16. The method of any one of the preceding embodiments, further comprising, based on comparing the first subset with the second subset, determining that the second subset is smaller than the first subset, and based on determining that the second subset is smaller than the first subset, generating the updated text file to include semantic tokens that describe the one or more attributes associated with the first candidate embedding.

17. The method of any one of the preceding embodiments, further comprising, based on comparing the first subset with the second subset, determining that the second subset is smaller than the first subset, and based on determining that the second subset is smaller than the first subset, generating the updated text file, wherein the updated text file lacks semantic tokens in the text file that describe the one or more attributes associated with the first candidate embedding.

18. One or more tangible, non-transitory, computer-readable media storing instructions that, when executed by a data processing apparatus, cause the data processing apparatus to perform operations comprising those of any of embodiments 1-17.

19. A system comprising one or more processors, and memory storing instructions that, when executed by the processors, cause the processors to effectuate operations comprising those of any of embodiments 1-17.

20. A system comprising means for performing any of embodiments 1-17.

What is claimed is:
1. A system for updating textual descriptions of items based on existing descriptions within an embedding space, the system comprising:
  one or more processors; and
  one or more non-transitory, computer-readable media storing instructions that, when executed by the one or more processors, cause operations comprising:
    receiving a text file comprising one or more semantic tokens for a textual description of an item;
    providing the text file to a generative language model to cause the generative language model to generate a first semantic representation of the textual description and a second semantic representation of the textual description different from the first semantic representation, wherein the generative language model has been trained to generate semantic representations based on text files;
generating, in an embedding space, a first candidate embedding of the first semantic representation and a second candidate embedding of the second semantic representation;
obtaining a plurality of embeddings of semantic representations of text associated with a set of existing items, wherein each embedding of the plurality of embeddings is represented in the embedding space;
determining a first subset and a second subset of the plurality of embeddings, the first subset comprising embeddings that are within a threshold distance from the first candidate embedding within the embedding space and the second subset comprising embeddings that are within the threshold distance from the second candidate embedding within the embedding space;
in response to determining that the first subset is smaller than the second subset, determining one or more attributes associated with the first candidate embedding; and
generating, based on the text file and the one or more attributes, an updated text file, wherein the updated text file includes an updated textual description based on one or more updated semantic tokens that describe the one or more attributes.

2. A method comprising:
obtaining a text file comprising a textual description of an item;
providing the text file to a generative language model to cause the generative language model to generate a first semantic representation of the textual description and a second semantic representation of the textual description different from the first semantic representation, wherein the generative language model is trained to generate semantic representations based on text files;
generating, in an embedding space, a first candidate embedding of the first semantic representation and a second candidate embedding of the second semantic representation;
obtaining a plurality of embeddings of semantic representations of text associated with a set of existing items, wherein each embedding of the plurality of embeddings is represented in the embedding space;
determining a first subset of the plurality of embeddings that are within a threshold distance from the first candidate embedding within the embedding space and a second subset of the plurality of embeddings that are within the threshold distance from the second candidate embedding within the embedding space;
comparing the first subset with the second subset;
based on comparing the first subset with the second subset, determining one or more attributes associated with the first candidate embedding; and
generating, based on the text file and the one or more attributes, an updated text file.

3. The method of claim 2, further comprising:
providing the updated text file to the generative language model;
based on providing the updated text file to the generative language model, generating, in the embedding space, a third candidate embedding of a third semantic representation of the updated text file;
determining that a third subset of embeddings of the plurality of embeddings is smaller than the first subset and the second subset, wherein the third subset comprises embeddings that are within the threshold distance from the third candidate embedding within the embedding space;
generating a set of semantic tokens associated with a set of attributes associated with the third candidate embedding; and
providing the set of attributes to the generative language model to cause the generative language model to generate an output comprising an updated description of the item based on the third semantic representation.

4. The method of claim 2, wherein determining the one or more attributes comprises:
generating a set of attention weights associated with the first candidate embedding, wherein the set of attention weights comprises a set of values corresponding to a set of semantic tokens associated with the text file;
determining a first semantic token associated with a first attention weight of the set of attention weights; and
generating the one or more attributes to include the first semantic token.

5. The method of claim 4, wherein determining the first semantic token associated with the first attention weight of the set of attention weights comprises:
determining a subset of the set of attention weights and a corresponding subset of semantic tokens of the set of semantic tokens, wherein each attention weight of the subset of the set of attention weights is greater than a threshold weight;
generating, for display on a user interface associated with a user, the corresponding subset of semantic tokens; and
receiving, via the user interface, a selection of the first semantic token.

6. The method of claim 2, further comprising:
obtaining a threshold density, wherein the threshold density indicates a threshold number of embeddings per unit volume of the embedding space;
determining a first spherical volume in the embedding space around the first candidate embedding, wherein the first spherical volume is characterized by the threshold density; and
determining the threshold distance based on a radius of the first spherical volume in the embedding space.

7. The method of claim 2, wherein obtaining the plurality of embeddings comprises:
obtaining, from a text file database, a plurality of text files associated with the set of existing items; and
providing the plurality of text files to an embedding model to cause the embedding model to generate the plurality of embeddings, wherein each embedding of the plurality of embeddings corresponds to a corresponding text file of the plurality of text files.

8. The method of claim 7, further comprising:
transmitting, to the text file database, a query for an updated plurality of text files;
obtaining the updated plurality of text files from the text file database;
providing the updated plurality of text files to the embedding model to cause the embedding model to generate an updated plurality of embeddings, wherein each embedding of the updated plurality of embeddings corresponds to a corresponding file of the updated plurality of text files; and
updating the first subset and the second subset to include one or more embeddings of the updated plurality of embeddings.

9. The method of claim 2, further comprising:
obtaining a plurality of training text files and a plurality of training semantic representations, wherein each training semantic representation of the plurality of training semantic representations is associated with a corresponding training text file of the plurality of training text files;
generating a plurality of training semantic token vectors, wherein each training semantic token vector of the plurality of training semantic token vectors represents the corresponding training text file of the plurality of training text files using semantic tokens; and
providing a training dataset to the generative language model to train the generative language model to generate semantic representations, wherein the training dataset comprises the plurality of training semantic token vectors and the plurality of training semantic representations.

10. The method of claim 2, wherein generating the updated text file comprises:
generating a set of semantic tokens associated with the one or more attributes;
generating a prompt for the generative language model, wherein the prompt includes the set of semantic tokens; and
providing the prompt to the generative language model to cause the generative language model to generate an updated textual description for the updated text file.

11. The method of claim 2, further comprising:
determining a first distance between the first candidate embedding and the second candidate embedding in the embedding space;
comparing the first distance with a threshold similarity distance;
based on comparing the first distance with the threshold similarity distance, determining that the first distance is below the threshold similarity distance; and
based on determining that the first distance is below the threshold similarity distance, providing the text file to the generative language model to cause the generative language model to generate a third semantic representation of the textual description, wherein a second distance between a third candidate embedding corresponding to the third semantic representation and the first candidate embedding is greater than the threshold similarity distance, and a third distance between the third candidate embedding and the second candidate embedding is greater than the threshold similarity distance.

12. The method of claim 2, further comprising:
based on comparing the first subset with the second subset, determining that the first subset and the second subset are of a same size;
based on determining that the first subset and the second subset are of the same size, determining an updated threshold distance;
determining an updated first subset and an updated second subset based on the updated threshold distance;
comparing the updated first subset with the updated second subset; and
based on comparing the updated first subset with the updated second subset, determining the one or more attributes associated with the first candidate embedding.

13. The method of claim 2, further comprising:
based on comparing the first subset with the second subset, determining that the first subset is smaller than the second subset; and
based on determining that the first subset is smaller than the second subset, generating the updated text file to include semantic tokens that describe the one or more attributes associated with the first candidate embedding.

14. The method of claim 2, further comprising:
based on comparing the first subset with the second subset, determining that the first subset is smaller than the second subset; and
based on determining that the first subset is smaller than the second subset, generating the updated text file, wherein the updated text file lacks semantic tokens in the text file that describe the one or more attributes associated with the first candidate embedding.

15. The method of claim 2, further comprising:
based on comparing the first subset with the second subset, determining that the second subset is smaller than the first subset; and
based on determining that the second subset is smaller than the first subset, generating the updated text file to include semantic tokens that describe the one or more attributes associated with the first candidate embedding.

16. The method of claim 2, further comprising:
based on comparing the first subset with the second subset, determining that the second subset is smaller than the first subset; and
based on determining that the second subset is smaller than the first subset, generating the updated text file, wherein the updated text file lacks semantic tokens in the text file that describe the one or more attributes associated with the first candidate embedding.

17. One or more non-transitory, computer-readable media comprising instructions that, when executed by one or more processors, cause operations comprising:
obtaining a text file comprising a textual description of an item;
providing the text file to a generative language model to cause the generative language model to generate a first semantic representation of the textual description and a second semantic representation of the textual description different from the first semantic representation, wherein the generative language model is trained to generate semantic representations based on text files;
generating, in an embedding space, a first candidate embedding of the first semantic representation and a second candidate embedding of the second semantic representation;
obtaining a plurality of embeddings of semantic representations of text associated with a set of existing items, wherein each embedding of the plurality of embeddings is represented in the embedding space;
determining a first subset and a second subset of the plurality of embeddings, the first subset comprising embeddings that are within a threshold distance from the first candidate embedding within the embedding space, and the second subset comprising embeddings that are within the threshold distance from the second candidate embedding within the embedding space;
based on determining that the first subset is larger than the second subset, determining one or more attributes associated with the first candidate embedding; and generating, based on providing the text file and the one or more attributes to the generative language model, an updated text file.

18. The one or more non-transitory, computer-readable media of claim 17, wherein the instructions cause operations further comprising:
    providing the updated text file to the generative language model;
    based on providing the updated text file to the generative language model, generating, in the embedding space, a third candidate embedding of a third semantic representation of the updated text file;
    determining that a third subset of embeddings of the plurality of embeddings is smaller than the first subset and the second subset, wherein the third subset comprises embeddings that are within the threshold distance from the third candidate embedding within the embedding space;
    generating a set of semantic tokens associated with a set of attributes associated with the third candidate embedding; and
    providing the set of attributes to the generative language model to cause the generative language model to generate an output comprising an updated description of the item.

19. The one or more non-transitory, computer-readable media of claim 17, wherein the instructions for determining the one or more attributes cause operations comprising:
    generating a set of attention weights associated with the first candidate embedding, wherein the set of attention weights comprises a set of values corresponding to a set of semantic tokens associated with the text file;
    determining a first semantic token associated with a first attention weight of the set of attention weights; and
    generating the one or more attributes to include the first semantic token.

20. The one or more non-transitory, computer-readable media of claim 19, wherein the instructions for determining the first semantic token associated with the first attention weight of the set of attention weights cause operations comprising:
    determining a subset of the set of attention weights and a corresponding subset of semantic tokens of the set of semantic tokens, wherein each attention weight of the subset of the set of attention weights is greater than a threshold weight;
    generating, for display on a user interface, the corresponding subset of semantic tokens; and
    receiving, via the user interface, a selection of the first semantic token.

* * * * *